US012296209B2

(12) United States Patent
Fazzio et al.

(10) Patent No.: US 12,296,209 B2
(45) **Date of Patent: *May 13, 2025**

(54) FIRE EXTINGUISHING AGENT NOZZLE STRUCTURE

(71) Applicant: Kidde Technologies, Inc., Wilson, NC (US)

(72) Inventors: Mark P. Fazzio, Wilson, NC (US); Terry Simpson, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,976

(22) Filed: Nov. 28, 2023

(65) Prior Publication Data

US 2024/0108924 A1 Apr. 4, 2024

Related U.S. Application Data

(62) Division of application No. 17/497,590, filed on Oct. 8, 2021, now Pat. No. 11,865,384, which is a division of application No. 16/103,478, filed on Aug. 14, 2018, now abandoned.

(51) Int. Cl.
*A62C 3/08* (2006.01)

(52) U.S. Cl.
CPC .................................... *A62C 3/08* (2013.01)

(58) Field of Classification Search
CPC .... A62C 3/08; B05B 1/04; B05B 1/14; B05B 1/02; B05B 1/18; B05B 1/046; B05B 1/1654; B05B 1/185
See application file for complete search history.

(56) References Cited

U.S. PATENT DOCUMENTS

| | | | |
|---|---|---|---|
| 2,340,006 A | 8/1940 | MacGregor | |
| 2,647,014 A | 7/1953 | Edwards | |
| 6,173,908 B1 | 1/2001 | Bureaux et al. | |
| 7,648,087 B2 | 1/2010 | Horn et al. | |
| 8,056,837 B2 | 11/2011 | Gardner et al. | |
| 11,865,384 B2 * | 1/2024 | Fazzio | A62C 31/05 |
| 2012/0043096 A1 | 2/2012 | Butz et al. | |
| 2015/0283412 A1 | 10/2015 | Kono et al. | |

(Continued)

FOREIGN PATENT DOCUMENTS

| | | |
|---|---|---|
| EP | 2764895 A1 | 8/2014 |
| FR | 2877240 A1 | 5/2006 |

(Continued)

OTHER PUBLICATIONS

European Office Action Issued in European Application No. 19190721.1 dated Feb. 10, 2021; 9 Pages.

(Continued)

*Primary Examiner* — Steven M Cernoch
(74) *Attorney, Agent, or Firm* — CANTOR COLBURN LLP

(57) ABSTRACT

An aircraft engine fire extinguishing system includes a supply housing for containing a fire extinguishing agent. Also included is a line for routing the fire extinguishing agent from the supply housing. Further included is a nozzle structure operatively coupled to the line, the nozzle structure having a non-circular opening for expelling the fire extinguishing agent.

4 Claims, 4 Drawing Sheets

(56) References Cited

U.S. PATENT DOCUMENTS

| | | | |
|---|---|---|---|
| 2016/0059057 | A1 | 3/2016 | Disimile |
| 2018/0099169 | A1 | 4/2018 | Lucas et al. |
| 2018/0161793 | A1 | 6/2018 | Disimile |
| 2018/0178970 | A1 | 6/2018 | Strange et al. |
| 2020/0054907 | A1 | 2/2020 | Fazzio et al. |
| 2022/0023689 | A1 | 1/2022 | Fazzio et al. |

FOREIGN PATENT DOCUMENTS

| | | | |
|---|---|---|---|
| GB | 1157775 | A | 7/1969 |
| JP | H09122537 | A | 5/1997 |
| WO | 2005018747 | A1 | 3/2005 |

OTHER PUBLICATIONS

European Search Report Issued in European Application No. 19190721.1 dated Jan. 14, 2020; 10 Pages.

* cited by examiner

FIRE EXTINGUISHING AGENT NOZZLE STRUCTURE

CROSS-REFERENCE TO RELATED APPLICATIONS

This application is a division of U.S. application Ser. No. 17/497,590 filed Oct. 8, 2021, which is a division of U.S. application Ser. No. 16/103,478 filed Aug. 14, 2018, the disclosures of each of which are incorporated herein by reference in their entirety.

BACKGROUND

The disclosure pertains to aircraft engines and, more particularly, to a nozzle structure for expulsion of a fire extinguishing agent.

Current aircraft engine nacelle and auxiliary power unit (APU) fire extinguishing systems typically utilize open tubes or simple circular orifices for nozzles to distribute gaseous agents. In some applications, it may be desirable to utilize liquid or solid (or a two-phase mixture thereof) extinguishing agents. The use of dry chemical or aerosol agents can result in inefficient distribution during expulsion from a hose, partly due to the energy loses plating out of the agent when contacting surfaces. The narrow and non-circular gaps between components within an engine nacelle or APU bay create a challenging environment to efficiently distribute these agents.

BRIEF DESCRIPTION

Disclosed is an aircraft engine fire extinguishing system including a supply housing for containing a fire extinguishing agent. Also included is a line for routing the fire extinguishing agent from the supply housing. Further included is a nozzle structure operatively coupled to the line, the nozzle structure having a non-circular opening for expelling the fire extinguishing agent.

In addition to one or more of the features described above, or as an alternative, further embodiments may include that at least a portion of the fire extinguishing agent is in a non-gaseous state.

In addition to one or more of the features described above, or as an alternative, further embodiments may include that the nozzle structure is located within an annular space defined by an engine core and a nacelle.

In addition to one or more of the features described above, or as an alternative, further embodiments may include that the non-circular opening is an arc shaped slot.

In addition to one or more of the features described above, or as an alternative, further embodiments may include that the arc shaped slot is a semi-circular opening.

In addition to one or more of the features described above, or as an alternative, further embodiments may include that the non-circular opening is an L-shaped opening.

In addition to one or more of the features described above, or as an alternative, further embodiments may include that the non-circular opening is a T-shaped opening.

In addition to one or more of the features described above, or as an alternative, further embodiments may include that the non-circular opening comprises a first linear segment, a second linear segment oriented perpendicularly to the first linear segment, and an arc shaped segment extending from one of the first linear segment and the second linear segment.

In addition to one or more of the features described above, or as an alternative, further embodiments may include that the non-circular opening comprises a first linear segment and a second linear segment oriented at a non-parallel angle to the first linear segment.

In addition to one or more of the features described above, or as an alternative, further embodiments may include that the non-circular opening is one of a plurality of apertures formed within the nozzle structure.

In addition to one or more of the features described above, or as an alternative, further embodiments may include that the non-gaseous fire extinguishing agent is at least one of a dry chemical or aerosol agent.

In addition to one or more of the features described above, or as an alternative, further embodiments may include that the nozzle structure is located within an auxiliary power unit compartment or bay.

In addition to one or more of the features described above, or as an alternative, further embodiments may include that energy losses are reduced when the fire extinguishing agent contacts surfaces of the non-circular opening compared to a circular opening.

Also disclosed is a method of distributing a fire extinguishing agent in an aircraft engine. The method includes routing a fire extinguishing agent from a supply housing to a nozzle structure. The method also includes expelling the fire extinguishing agent from the nozzle structure through a non-circular opening of the nozzle structure.

In addition to one or more of the features described above, or as an alternative, further embodiments may include that at least a portion of the fire extinguishing agent is in a non-gaseous state.

In addition to one or more of the features described above, or as an alternative, further embodiments may include that the non-circular opening is one of a plurality of non-circular openings defined by the nozzle structure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. The embodiments disclosed herein pertain to a nozzle structure used to distribute a fire extinguishing agent. In some embodiments, fire extinguishing systems utilized in aircraft engines particularly benefit from the nozzle structure disclosed herein. However, it is to be appreciated that other applications may employ the nozzle structure.

Figure 2:
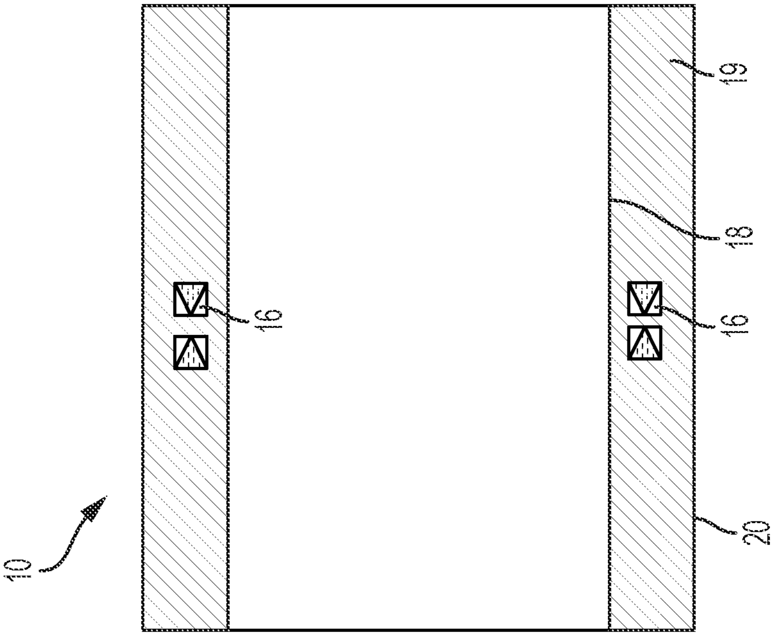
FIG. 2 is a schematic side, sectional view of the nozzle structure within the outer annular region of the aircraft engine.
Figure 1:
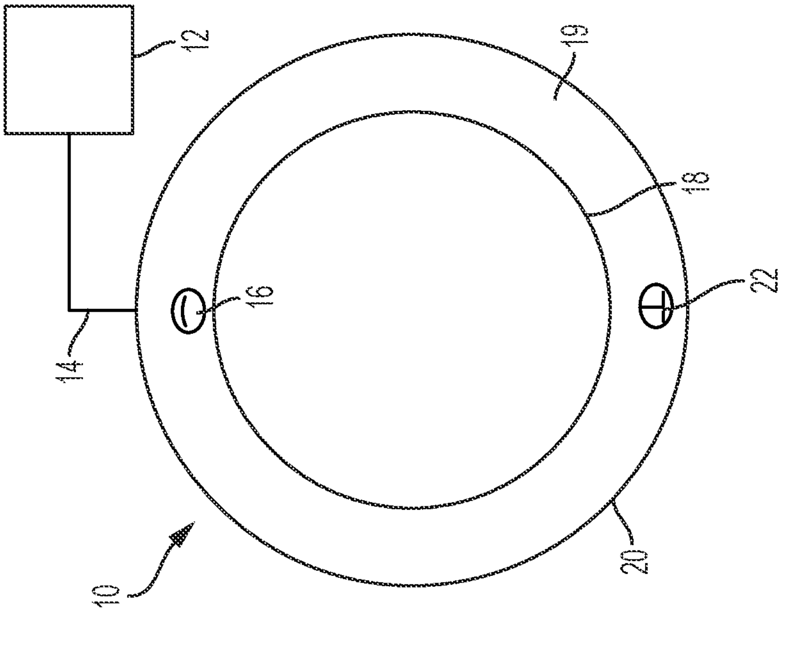
FIG. 1 is a schematic end view of a nozzle structure within an outer annular region of an aircraft engine.

Referring to FIGS. 1 and 2, a portion of an aircraft engine 10 is schematically illustrated. The aircraft engine 10 includes one or more regions that include a fire extinguishing system to limit or eliminate a threat posed from a fire. The fire extinguishing system includes a supply housing 12 that is configured to contain a fire extinguishing agent. The fire extinguishing agent is routed through a line 14 that fluidly connects the supply housing 12 to a nozzle structure 16. In the illustrated embodiment, the nozzle structure 16 is located in an annular space 19 defined, at least partially, by an outer engine core 18 and a nacelle 20 (or cowl). However, it is to be appreciated that the location of the nozzle structure 16 may be located in other areas of the aircraft engine 10 to distribute the fire extinguishing agent to other locations, such as an auxiliary power unit (APU) compartment or bay.

Regardless of the location of the nozzle structure 16, the supply housing 12 may be located in close vicinity thereto or may be remotely located, such that the line 14 routes the fire extinguishing agent from one location of the aircraft engine 10 to the location of the nozzle structure, e.g., outside of annular space 19 to annular space 19.

To avoid the issues with discharging non-gaseous fire extinguishing agents from circular openings at the end of a supply line, the embodiments disclosed herein include one or more non-circular cross-sectional openings 22 to distribute the non-gaseous fire extinguishing agent. The fire extinguishing agent utilized with the disclosed embodiments is in a non-gaseous state. In some embodiments, the non-gaseous fire extinguishing agent is a dry chemical or aerosol agent used for suppressing fire. By describing the fire extinguishing agent as a "non-gaseous state" herein, it is to be understood that this phrase defines an agent that is not formed solely or substantially solely as a gas state agent. In other words, a liquid, a solid, a solid-liquid (2-phase) mixture or any other mixture of a gaseous and non-gaseous agent—even a 3-phase mixture—may be employed in various embodiments.

Figure 3:
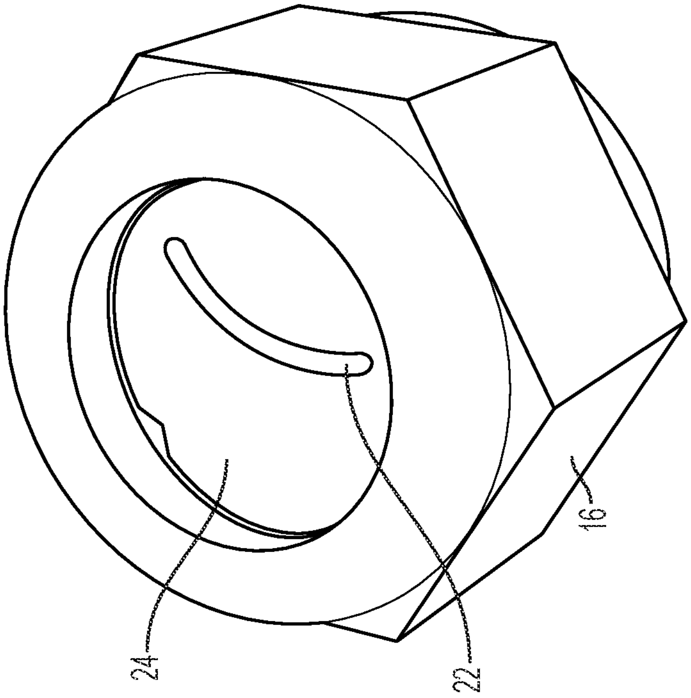
FIG. 3 is a perspective view of the nozzle structure.
Figure 5:
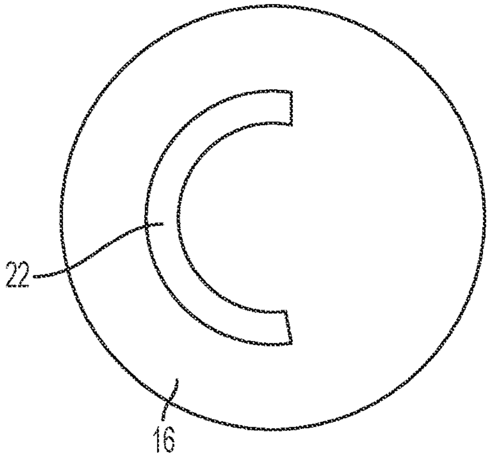
FIG. 5 is a sectional view of the nozzle structure according to another aspect of the disclosure.
Figure 6:
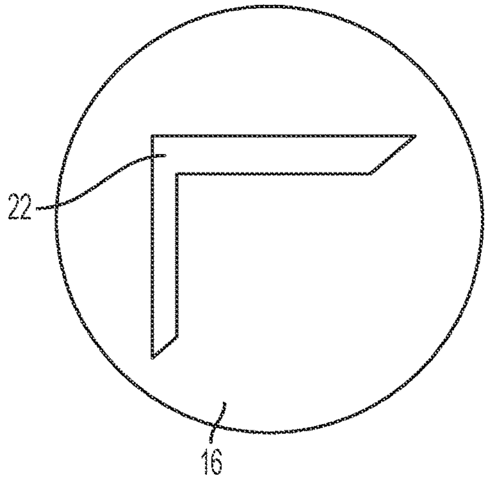
FIG. 6 is a sectional view of the nozzle structure according to another aspect of the disclosure.
Figure 9:
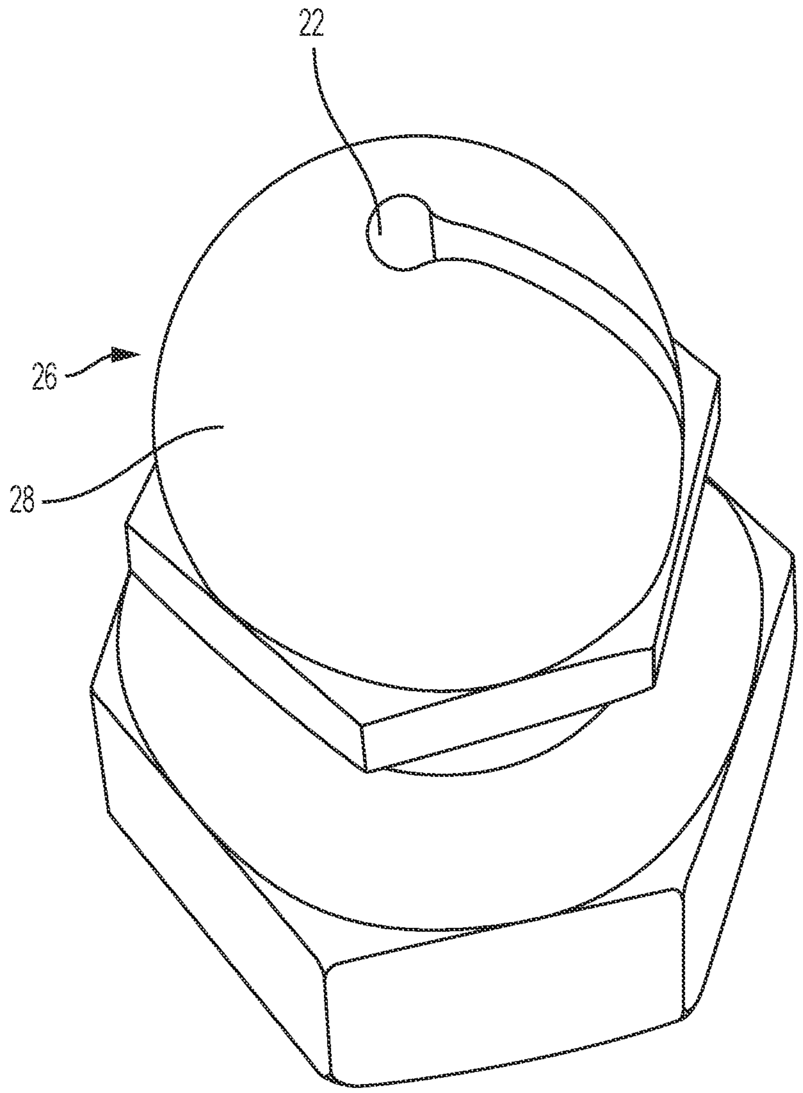
FIG. 9 is a perspective view of the nozzle structure according to another aspect of the disclosure.

The nozzle structure 16 coupled to, or integrally formed with, the end of the line 14 may have various structural geometries. As shown in FIG. 3, a flat or slightly recessed nozzle structure 16 may be employed with the non-circular opening(s) 22 defined by a face 24 of the nozzle structure 16. Alternatively, as shown in FIG. 9, a head portion 26 of the nozzle structure 16 may be provided, with the non-circular opening(s) 22 defined by an outer surface 28 of the head portion 26. The illustrated embodiments are merely examples and it is to be appreciated that other geometries of the nozzle structure 16 may be utilized.

In the case of a plurality of non-circular openings 22 (FIG. 4) defined in the nozzle structure 16, the openings may be any suitable combination of holes, slots, apertures or the like, and may be arranged in any desirable orientation. FIGS. 3-8 illustrate various examples of non-circular openings, but it is to be understood that the illustrations and associated descriptions herein are not intended to be limiting, as several variants may be utilized based on the particular application of use.

Figure 4:
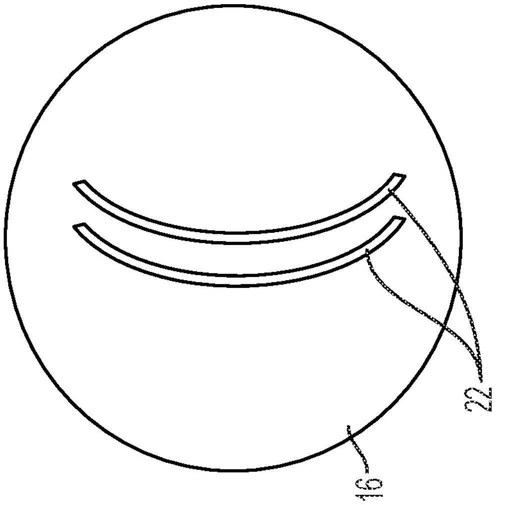
FIG. 4 is a sectional view of the nozzle structure of FIG. 3.
Figure 7:
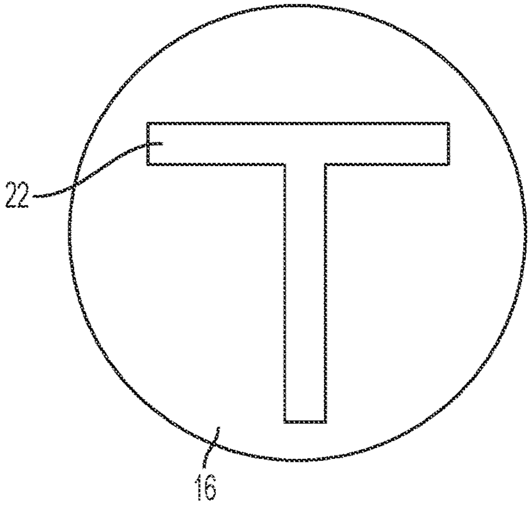
FIG. 7 is a sectional view of the nozzle structure according to another aspect of the disclosure.
Figure 8:
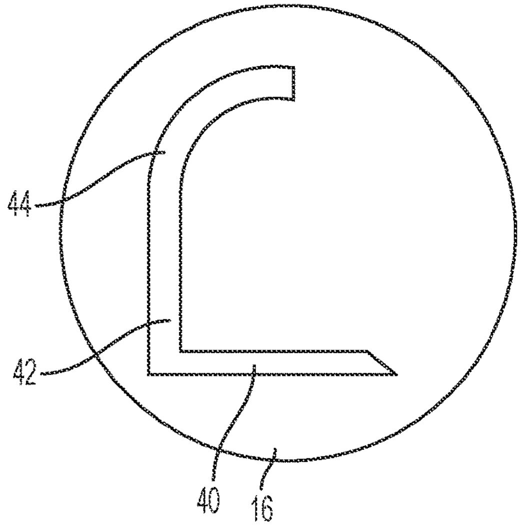
FIG. 8 is a sectional view of the nozzle structure according to another aspect of the disclosure.

FIGS. 3 and 4 illustrate the non-circular opening 22 as an arc shaped slot. Alternatives include a semi-circular opening (FIG. 5), an L-shaped opening (FIG. 6), and a T-shaped opening (FIG. 7). Additionally, any combination of substantially linear—or planar—segments may be combined with any arc shaped segment. By way of example, FIG. 8 illustrates the non-circular opening as having a first linear segment 40, a second linear segment 42 oriented perpendicularly to the first linear segment 40, and an arc shaped segment 44 extending from the second linear segment 42. In such an embodiment, the arc shaped segment 44 could extend from the first linear segment 40 instead of the second linear segment 42, or two arc shaped segments may be included to have an arc shaped segment extending from each of the linear segments. It is to be appreciated that the illustrated non-perpendicular orientation is merely one example, as any angle between the segments may be employed in various embodiments. For example, the two linear segments 40, 42 may be oriented at any non-parallel angle relative to each other.

In operation, energy losses are reduced when the non-gaseous agent contacts surfaces associated with the embodiments of the nozzle structure 16 disclosed herein, when compared to a circular cross-sectional area opening. The various non-circular openings disclosed herein may be customized and optimized to match the contour of the region in which the fire extinguishing agent is being distributed. For example, a curved slot could have a geometry that matches the radius of the gap between the components defining the annular space 19 described above. Other more complicated shapes, or combinations of shapes, may be employed to distribute the agent between components.

Advantageously, the fire extinguishing agent can be distributed into a complex region with minimal impacts of the discharging agent on nearby components. By maintaining the energy of the discharging agent and gas, the distribution throughout the entire region is more efficient, thus minimizing the weight of the agent required to be stored.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The embodiments disclosed herein can be a system, a method, and/or a computer program product at any possible technical detail level of integration. The computer program product can include a computer readable storage medium (or media) having computer readable program instructions thereon for causing a processor to carry out aspects of the present disclosed embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the disclosed embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed embodiments.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of distributing a fire extinguishing agent in an aircraft engine, wherein the aircraft engine includes:

an engine core;

a nacelle, wherein an annular space is defined between the engine core and the nacelle; and a fire extinguishing system including:

a supply housing for containing a fire extinguishing agent;

a line for routing the fire extinguishing agent from the supply housing; and a nozzle structure operatively coupled to the line, the nozzle structure having an opening for expelling the fire extinguishing agent, wherein the nozzle structure is located within an annular space defined by the engine core and the nacelle, the opening is recessed with respect to the face of the nozzle structure, the opening defined by a face of the nozzle structure, and the opening through which fluid passes is end-to-end continuous and includes:

a first linear segment and a second linear segment oriented perpendicularly to the first linear segment so that the opening through which fluid passes defines an L-shape with first and second straight legs that extend from a vertex; and an arc shaped segment extending continuously from the second linear segment so that the opening through which fluid passes further defines an arc shape leg that extends beyond the second straight leg, the method comprising:

routing the fire extinguishing agent from the supply housing to the nozzle structure; and expelling the fire extinguishing agent from the nozzle structure through the opening of the nozzle structure.

2. The method of claim 1, wherein at least a portion of the fire extinguishing agent is in a non-gaseous state.

3. The method of claim 1, wherein the opening is one of a plurality of openings defined by the nozzle structure.

4. The method of claim 2, wherein the portion of the fire extinguishing agent that is in the non-gaseous state is at least one of a dry chemical or aerosol agent.

* * * * *